US005081487A

United States Patent [19]

Hoyer et al.

[11] Patent Number: 5,081,487

[45] Date of Patent: Jan. 14, 1992

[54] CUT SHEET AND COMPUTER FORM DOCUMENT OUTPUT TRAY UNIT

[75] Inventors: August Hoyer, Penfield; John R. Masley, Farmington; Thomas E. Bitter, Rochester, all of N.Y.

[73] Assignee: Xerox Corporation, Stamford, Conn.

[21] Appl. No.: 645,862

[22] Filed: Jan. 25, 1991

[51] Int. Cl.[5] .............................................. G03B 27/62

[52] U.S. Cl. ...................................... 355/75; 355/321; 271/213

[58] Field of Search ................... 355/75, 321; 271/213

[56] References Cited

U.S. PATENT DOCUMENTS 4,097,147 6/1978 Portewig .
4,191,467 3/1980 Schieck .
4,526,361 7/1985 DuBois .
4,597,326 7/1986 Kultaranta .
4,635,916 1/1987 Modugno et al. .
4,664,509 5/1987 Christy et al. .
4,696,591 9/1987 Boyden .
4,754,960 7/1988 Muller .
4,773,781 9/1988 Bankier .
4,794,429 12/1988 Acquaviva .
4,982,945 1/1991 Marasco et al. .
4,993,701 2/1991 Tosserams .......................... 271/207

FOREIGN PATENT DOCUMENTS 0347973 12/1989 European Pat. Off. .
2176770A 1/1987 United Kingdom .

OTHER PUBLICATIONS

Xerox Disclosure Journal, "Computer Fan-Fold Document Restacking", Mark D. Tracy, Jan./Feb., 1986, vol. 11, No. 1, p. 9.

United States Statutory Invention Registration, Reg. No. H17, Computer Form Web Copying Apparatus, Stephen J. Wenthe, Jr., Feb. 4, 1986.

*Primary Examiner*—Monroe H. Hayes

[57] ABSTRACT

In a document imaging apparatus in which documents are fed to an imaging station and then fed to a documents catch tray system for automatic document restacking, there is provided a common, shared, restacking catch tray receiving either cut sheet documents or computer form (CF) web documents at the upper surface of the imaging apparatus, rather than dropping the CF web down to a tray below the end of the apparatus. This dual mode restacking catch tray is pivotable from a first position at a generally horizontal tray angle for restacking cut sheet documents into a second position at a preferred angle for fan-folding a computer form web. There is also an upper baffle unit partially overlying the output path to the restacking area, which is pivotable between a first position for planarly guiding cut sheet documents, and a second, raised, position for guiding a computer form web arcuately and then downwardly into the restacking area with an integral CF guide baffle. This upper baffle unit desirably includes an integral gate which automatically selectively gates documents onto two different paths segments, below or over the guide baffle, which gate may be provided by one end of the guide baffle.

12 Claims, 3 Drawing Sheets

CUT SHEET AND COMPUTER FORM DOCUMENT OUTPUT TRAY UNIT

There is disclosed herein an improvement in original document handling for copiers, with a repositionable dual mode restacking tray unit for desirably collecting either sheet documents or computer form (CF) (fan-folded web) documents in the same tray unit in two different desired sheet guiding and restacking positions.

In xerographic and other copiers, or document scanners, or other document imaging systems, it is desirable to automatically feed either normal individual sheet documents, (otherwise called "cut sheet" documents), or a continuous computer form web document (normally stacked "fan-folded") across the platen of a copier or other imaging station for imaging. This is preferably done with a document feeder (document handler). After either type of document has been copied, it is desirably automatically restacked in a restacking catch tray. Heretofore, typically a tray suitable for restacking individual cut sheet documents was not suitable for restacking (re-fan-folding) computer form web documents. Typically, computer form web (CF) documents were cascaded over the machine edge down into a CF tray near the floor at the end or side of the machine for re-fan-folding.

Thus, typically, two separate document restacking trays were required for document restacking after documents were fed from the platen or other imaging station by the automatic document feeder. One tray was for restacking regular document sheets at the platen exit level. That tray typically had to be removed or pivoted down to allow for restacking CF fan-fold in a much lower, separate, special CF restacking tray, to provide the desired CF web drop distance and guidance for the CF fan-fold to properly refold (restack) in that separate CF restacking tray.

In a prior art computer form or fan-fold document stacking tray into which the documents must be cascaded over the side or end of the document, there is considerable danger of a portion of the document falling onto the floor and being damaged or contaminated. It also requires stooping or bending over by the operator. It is also more difficult for the operator to simultaneously operate the document feeding controls or control panel on the top of the copier while simultaneously watching and controlling the restacking of the fan-fold document.

Also, frequently, fan-fold web documents require some initial manual folding of the first few web segments to start the proper restacking (refolding) of the fan-fold documents. That is very difficult to do simultaneously with controlling the operation of the document handler when the CF restacking tray is below the level of the platen at the end or side of the copier.

The present system provides a simple, low cost, dual mode document catch tray unit which is capable of being reconfigured easily by the operator into two different configurations or positions. As shown in the disclosed embodiment, in one mode, individual documents ejected from the platen may be stacked in a common tray area in one position, and in the other mode it is repositioned for computer fan-fold web to be restacked therein.

It is important to note that in both configurations, the disclosed system allows restacking of the documents at the top of the machine, easily accessible by the operator, close to the controls, and close to the imaging station at which the documents are being imaged. This disclosed configuration allows the document ejection and restacking path to be desirably near to, and in the plane of, the platen, i.e., approximately at platen level.

Another described feature is that the same document catch tray desirably lays flat for cut sheet but lies at a preset desired angle for CFF restacking.

Additionally disclosed is a positively controlled arcuate guide path for assisting restacking of CF web. As shown, this may be integral a baffle unit overlying the document exit path.

As also disclosed herein, the conversion of the exemplary catch tray unit between its two modes of operation can be accomplished by simple motions utilizing simple pivoting mechanisms of portions of the tray unit.

Also disclosed herein in the specific disclosed example is a dual mode stacking system in which there is additionally provided a repositionable overlying baffle for arcuately guiding computer form paper into the output stacking tray in one position cooperatively with a catch tray having an adjustable angular position to optimize stacking of the computer form paper, and a deflector or gate which works in conjunction with the baffle to control the feeding and stacking of the CF web.

The disclosed system is particularly useful for collecting the output of a dual mode type of automatic document feeder capable of automatically feeding either conventional cut sheet type documents or CF web to and from the imaging station of a copier. Some examples of such document feeders are shown in Xerox Corp. U.S. Pat. No. 4,794,429, and other art cited therein, but the present system is not limited thereto.

Of particular background interest, a preferred example of such a suitable RDH/SADH with an angled document catch tray and a partially overlying baffle thereto is shown in Xerox Corporation U.S. Pat. No. 4,579,326, issued April, 1986, to T. S. Pinckney, et al.

To describe the disclosed embodiment example in other words, there is disclosed a pivotable output catch tray designed to operate dually, with one position for cut sheet throughput and another position for computer fan fold (CFF) sheet throughput, which allows the CFF web to be stacked from platen glass level up to restacking height of several inches. The tray may be easily reconfigured in simple motions by the operator, with a pivoting interconnection.

There is disclosed herein a low cost and simple system for changing from the collection and stacking of copied regular sheet documents in a first location, substantially in the plane of a copier imaging station, to a second location also substantially in of the plane of the copier imaging station, for refolding or fan-fold restacking of an elongated computer form (CF) web document, without requiring two separate upper and lower restacking trays, and without having to remove an upper tray to allow a proper restacking path into a lower tray.

As shown in the cited art, this type of document catch tray is particularly desirable for use with, and closely adjacent, a semi-automatic document handler (SADH). That may be a known dual mode document handler with recirculating document handler (RDH) having an alternative linear SADH path, as noted immediately alone. In SADH units, it is desirable to maintain a relatively planar path for the document, for the platen feeding reliability of large, damaged, or sensitive and/or stiff (thick) documents and CFF.

An important and successful recent example of another dual mode document restacking tray is shown U.S. Pat. No. 4,982,945, issued Jan. 8, 1991, to Xerox Corporation, by J. Marasco and M. Sugiyma, entitled: "Plural Mode Document Restacking Tray for a Copier Document Handler". However, it may be seen that the system therein restacks CF web down at one side or end of the machine, as noted above.

Another dual mode document catch tray reference of particular interest is European patent application A1 0 347 973 published Dec. 27, 1989, by Anne Willem (Océ-Netherland, B.V.). Also U.S. Pat. No. 4,191,467, issued Mar. 4, 1980, R. A. Schieck (Xerox Corporation).

U.S. Pat. No. 4,635,916, issued Jan. 13, 1987, to J. J. Modugno, et al., (Xerox Corporation), discloses a dual mode document feeder and computer forms web restacker. CF web output is restacked in the normal document feeding input tray of an RDH.

Various types of regular sheet document and computer form (CF) fan-folded web document restacking trays are known in the art. The following patent disclosures are noted as examples: Xerox Corporation U.S. Pat. No. 4,754,960, issued July 5, 1988 to G. A. Muller, and Xerox Corporation U.S. Statutory Invention Registration SIR H17, by Stephen J. Wenthe, Jr., published Feb. 4, 1986, and various other art noted therein.

Additional art of interest, re a commercial fixed configuration fan-fold web "uphill" document restacking tray, is U.K. patent application G. B. 2,176,770A published Jan. 7, 1987, by Ian G. Kershaw (Xerox Corporation).

Another form of CF web restacking from an RDH is verbally described in the Xerox Disclosure Journal, Volume 11, No. 1, January/February, 1986, page 9 entitled: "Computer Fan-fold Document Restacking", by Mark D. Tracy.

Of lesser interest, U.S. Pat. No. 4,773,781 to Bankier discloses a removable and repositionable paper collection tray comprising a floor which extends between a pair of sidewalls. The wall includes a projection, at each end, which is received in a respective slot to hold the tray in an angled position. See Col. 4, lines 34–42.

U.S. Pat. No. 4,664,509, to Christy, et al., (Xerox Corporation), is a dual mode document feeder.

U.S. Pat. No. 4,696,591 to Boyden discloses a printer having a CFF output comprising a catch tray which is able to cantilever upwardly at an angle of 20°–50° from the printer output. Cantilevered support occurs via integrally formed hooks which are defined by sidewalls. At the tray bottom, an arcuate and cam-like surface is abutted against the printer output. See Col. 1, lines 30–40.

U.S. Pat. No. 4,526,361 to DuBois discloses a device comprising a pivot finger assembly. See Col. 4, lines 50–60.

U.S. Pat. No. 4,097,147 to Portewig discloses a tray assembly comprising an originals/print-paper tray interconnected with a copies tray. The assembly is constructed to position mouths of the original/print-paper tray and the copies tray at respective inlets and outlets of a print machine. Adjustable guides are included at the mouths of the respective trays. A telescoping adjustable arm is connected between the lower ends of the respective trays beneath the print machine.

The terms copier and document handler as used herein are intended to include electronic document readers or scanners and their document feeders as well as conventional xerographic and other copiers.

A particular described and claimed feature is to provide, in a document imaging apparatus in which both conventional cut sheet documents and computer form web fan-folded documents are fed to an imaging station accessible at the upper surface of said imaging apparatus and then said documents are fed in an output path from said imaging station to a documents catch tray system for automatic document restacking, the improvement in said documents catch tray system comprising: a common shared restacking catch tray area adapted to receive both cut sheet documents and computer form web fan-folded documents, said common shared restacking catch tray area being adjacent said imaging station at the upper surface of said imaging apparatus, said common shared restacking catch tray area being pivotable between a first position at a preferred tray angle for restacking cut sheet documents thereon and a second position at a different preferred angle for fan-fold restacking of a computer form web thereon; and an upper baffle unit at least partially overlying said output path from said imaging station to said restacking catch tray area, said upper baffle unit being pivotable between a first position for guiding cut sheet documents into said restacking catch tray area for stacking, and a second, raised, position for guiding a computer form web arcuately into said restacking catch tray area for fan-fold restacking.

Further specific features provided by the system disclosed herein, individually or in combination, include those wherein said upper baffle unit in said second position provides a said output path which arcuately guides a computer form web document up above the level of said common restacking catch tray area and then downwardly towards said restacking catch tray area; and/or wherein said upper baffle unit has an integral baffle guide and provides two different alternative, output path segments: a first, substantially linear, output path under said baffle guide for guiding cut sheet documents into said restacking catch tray area in said first position of said upper baffle unit, and a second, arcuate, output path segment over said baffle guide for arcuately guiding computer form web documents into said restacking catch tray area in said second position of said upper baffle unit; and/or wherein said upper baffle unit includes an integral gate which is automatically pivoted to automatically selectively gate documents into said respective first or second output paths segments below or over said baffle guide when said upper baffle unit is pivoted between said first and second positions; and/or wherein said integral gate comprises an end of said baffle guide adjacent said imaging station which is moved above or below said output path therefrom when said upper baffle unit is pivoted between said first and second positions; and/or further including edge guide means for assisting computer form web restacking, which edge guide means is automatically raised into its operative position when said said restacking catch tray area is pivoted into said second position for fan-fold restacking of a computer form web document thereon; and/or wherein said upper baffle unit in said second position provides a major portion of said output path which arcuately guides a computer form web document up above the level of said common restacking catch tray area and then downwardly towards said restacking catch tray area adjacent said edge guide means; and/or wherein said upper baffle unit in said second position provides an output path for the computer form web fan-folded documents which provides a stopping position for the web with a fan-fold exited from said upper baffle unit but substantially above said restacking catch tray area; and/or wherein said feeding of computer form web documents to said imaging station is incremental with variable stopping positions of said computer form web such that said incremental stopping positions accommodate different distances between said fan-folds of a said computer form web.

All references cited in this specification, and their references, are incorporated by reference herein where appropriate for appropriate teachings of additional or alternative details, features, and/or technical background.

Various of the above-mentioned and further features and advantages of the invention will be apparent from the apparatus and its operation described in the specific example below. Thus, the present invention will be better understood from the following description of this exemplary embodiment thereof, including the drawing figures (approximately to scale) wherein.

Figure 1:
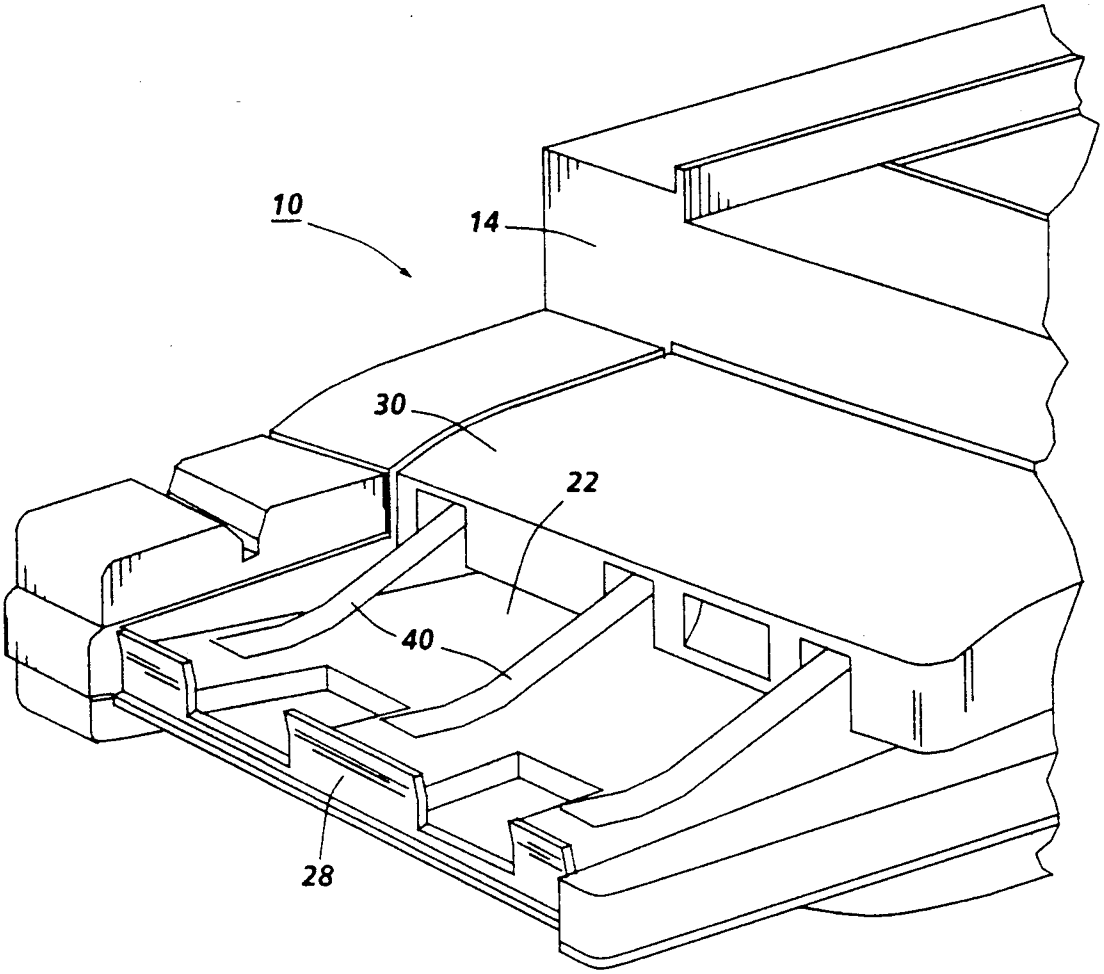
FIG. 1 is a perspective view of one embodiment of the present document restacking system, with the document stacking tray unit in its down or cut sheet document restacking position, shown mounted to one example of a copier adjacent an exemplary dual mode automatic document feeder, (partially shown) as cited above.
Figure 2:
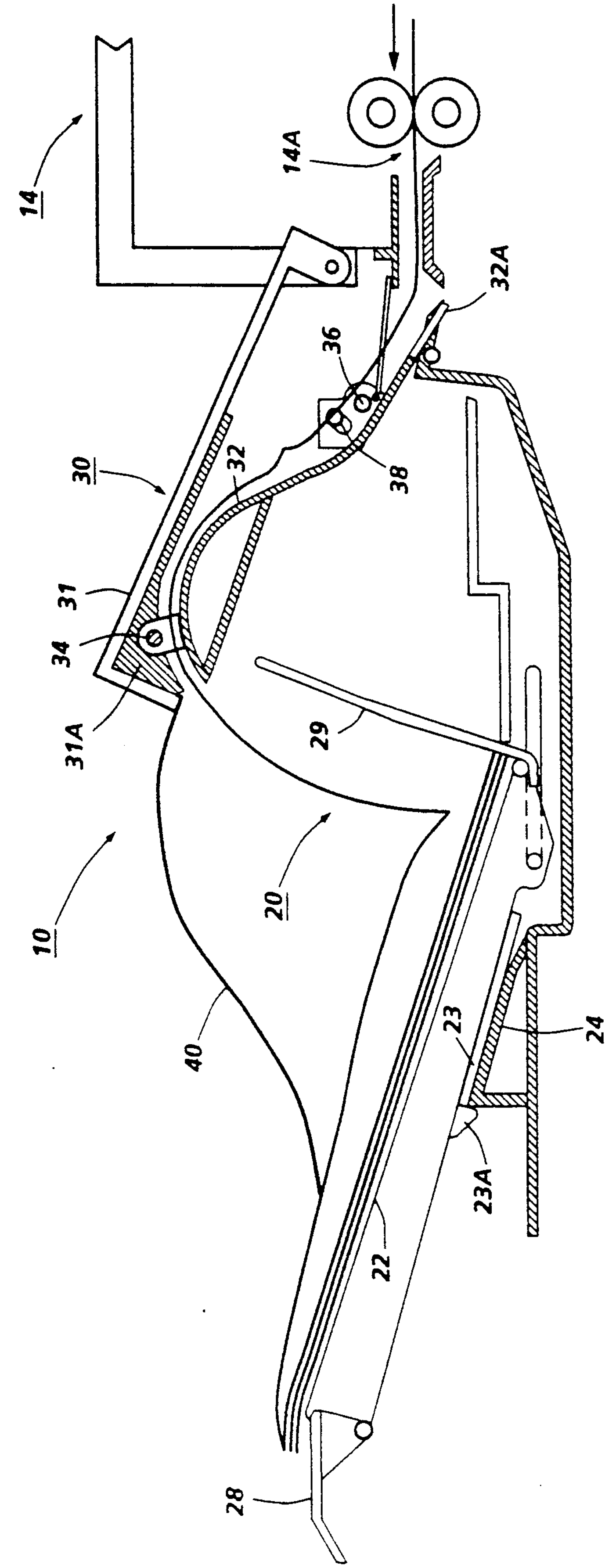
FIG. 2 is an enlarged frontal view, partly in cross-section, of the document restacking system embodiment of FIG. 1, in the alternative up (CF) restacking position.
Figure 3:
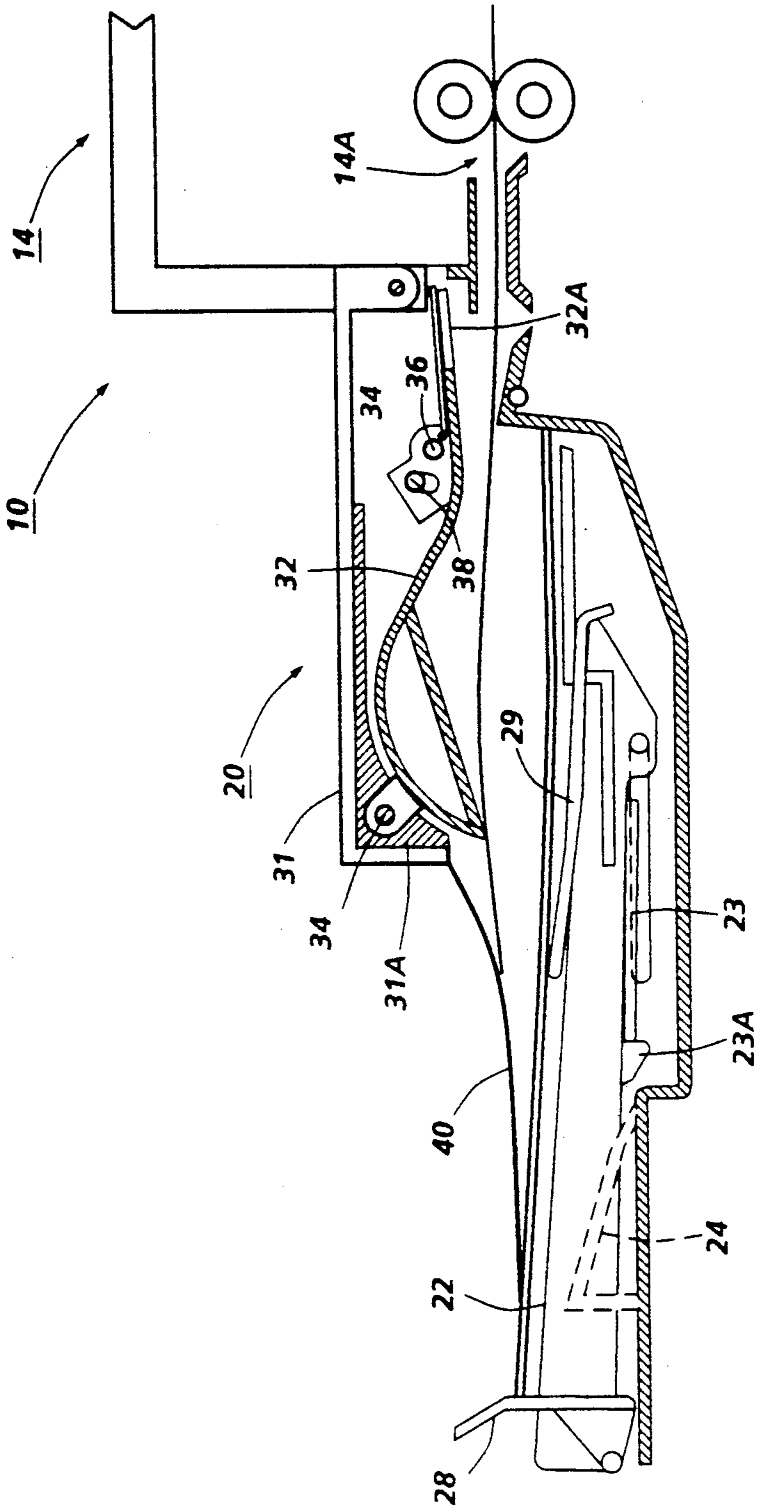
FIG. 3 is the same as FIG. 2 but in the down or cut sheet document restacking position.

Describing now in further detail the exemplary restacking system embodiment 20 with reference to these Figures, there is shown by way of one example a xerographic copier type of reproducing machine 10 for selectably feeding and copying either regular cut sheet documents or CF web with a dual mode automatic document handler (DH) or feeder 14. The copier 10 and its DH 14 are preferably controlled by a generally conventional programmable controller, as disclosed in, e.g., U.S. Pat. No. 4,475,156 and art cited therein. This machine control preferably includes a known screen operator input control and display on top of the copier 10. The DH 14 is of the above-cited type into which either regular cut sheet documents or CF web may be loaded and fed in a known manner. Here, both types of documents are collected, after imaging and ejection from the DH 14, in the restacking unit 20. After imaging the documents on the copier 10 imaging station or platen (under the DH 14) the documents are ejected and stacked in the copy sheet exit catch tray area 22.

Disclosed here is a single, but plural-mode function, repositionable document output tray unit 20. The tray unit 20 is mounted on top of the copier 10 (defining part of the top cover) adjacent the document exit path or output 14*a* of the DH 14. The unit 20 has a common integral restacking tray portion or catch tray area 22. The tray surface 22 is preferably generally or approximately horizontal in the first or cut sheet operating position. The exemplary tray 22 is slidably mounted on underlying integral skis 23. When the tray 22 is pulled to the left (pulled out) the skis 23 ride up on ramps 24 [or other suitable mountings]. Thus, this tray surface 22 can be slid and tilted up from a first or lower planar position approximately at the copier platen level (and more closely adjacent the exit or output of the DH 14) for restacking regular document sheets (cut sheets). That is, the tray 22 may be slid to the left to tilt up to a second position at an angle of about 15 degrees above the horizontal for desired CF restacking. 15 to 17 degrees was found optimum. In this tilted up CF position, spring-loaded CF edge guide fingers 29 automatically pop up adjacent the front or upstream edge of the tray 22 restacking area.

The tray 22 can be retained in its upper (CF) position, by for example, as shown, locking notches 23*a* on the skis 23 engaging the upper end of the fixed ramps 24. That locks the tray 22 up in that position. To unlock, it is pivoted up slightly, which frees it to slide to the right down the ramps 24 into its lower or regular document position.

The tray 22 may also preferably be provided with generally vertical document end stop(s) 28. The end stops 28 may be pivoted up to provide a document end stop, guide, or wall at the outer end of document tray 22. This is an additional, optional, output guide or registration feature, for smaller, e.g. standard size documents. This pop-up document end wall or stop 28 can be pivoted up to form an end stop or stack end wall usable for restacking smaller documents to that position, closer to the DH 14 exit. This end stop 28 is foldable down flush with the rest of the tray surface 22 for collecting or restacking larger document sheets on, or extending beyond, the full surface of tray 22, thus providing two different modes of operation in that tray position.

Thus, is may be seen from the above that the one disclosed document tray unit 20 can optionally provide different modes of operation, with different positions, all easily changed by the copier operator.

Cooperatively functional with, and repositionable with, the tray 22 is an upper baffle unit 30. The upper baffle unit 30 is an integrally pivotable unit. In its lower or horizontal position it provides for regular or cut sheet document feeding, in which these sheets are fed linearly at platen level under the baffle unit 30 in the regular document output path to the catch tray area 22. In the second, or raised, position of the upper baffle unit 30, it provides a special guide for computer forms feeding in an arcuate path therethrough to the catch tray area 22, as will be described.

The upper baffle unit 30 here includes an external cover 31, on the inside of which may be provided internal guide fins 31*a* or other baffle or deflector members defining an upper baffle for CF feeding. Mounted spaced below these guide fins 31 is a baffle guide or plate 32. As shown, this is a wave form or "S" shaped baffle plate here. The baffle plate 32 also provides an integral document path selection gate 32*a*. When the upper baffle unit 30 is raised to its up or CF position, the upstream end of the baffle plate 32, comprising gate end portion 32*a*, semi-independently pivots from above the document exit path 14*a* of the document feeder 14 output to below that document exit path. Thus this gate portion 32*a* automatically is moved down into a position to deflect CF web up above, rather than below, the baffle plate 32. That is, when the baffle unit 30 is raised for CF feeding, the path segment of the document path to the catch tray area 22 is automatically changed from a relatively linear path below the baffle 32, to an arcuate path over the top of baffle 32. A planar plate or portion of the baffle 32 on the lower surface thereof can assist the linear path therebelow and prevent stubbing of regular documents. In contrast, the arcuate upper surface of the baffle 32 provides a smooth transition or natural extension of the computer form web being fed into an arcuate loop path. That is, the upper surface of the baffle 32 has a large radius, with a smooth transition, so that the CF web exits the upper baffle unit 30 spaced substantially above the platen level and the level of the restacking or catch tray area 22. At this CF output point the arcuate baffle 32 and the opposing internal guide fins 31*a* also have arcuately deflected the CF web path so that the CF web is moving downwardly toward the tray area 22 at its release point. This directs the CF web, particularly the "burst line" between web segments where folding must occur, into the optimum position for folding, as shown.

The pivoting up of the upper baffle unit 20 also provides a vertical space between the upper baffle unit 30 and the catch tray area 22. This is determined by the amount by which the upper baffle unit 30 pivots up to its raised or CF position. That, in turn, determines the maximum number of CF web segments or sheets which one can stack successfully. Also, as noted above, a catch tray 22 surface of approximately 15 degrees is preferred. It has been found that a tray angle of substantially more than 15 degrees can negatively effect stacking of light-weight CF, that is, 16 lbs. or less. CF forms of this thinness have insufficient beam strength to stand up and remain flat in the catch tray 22 at substantially increased angles. This particular tray 22 is optimized for approximately a 22-hole standard CF web, that is, 22 sprocket holes per CF web segment between burst lines.

It has also been found to be important for reliable stacking that the system be operated so that the burst lines in the CF web stop at the same location relative to the tray 22, defined as optimum, regardless of the particular computer form. It has been found that improved fan-fold restacking is provided by the present system if the incremental feeding and copying of the web causes the web to stop with the fan-fold crease (first line) over, but spaced above, the tray 22. Specifically, it has been found that each time the CF web is stopped on the platen of the copier for imaging by the document handler 14 platen transport, that, at that stopping position of the web, a preceding fan-fold crease in the web should be about 5 sprocket holes (2 to 3 inches) extending out of the exit from the upper baffle unit 30, but above the level of the previously CF web in the tray 22. This provides fan-fold restacking assistance.

The incremental restacking position of the CF web here is a function of the path length of the CF web from the document handler exit 14*a* up over the "S" shaped baffle 32 in its raised position. Preferably there are a minimum of two web segments (and thus two web creases) in this baffle path, even for the longest standard CF web segments (22 or 24 hole standard CF web lengths). For shorter standard CF web lengths, 3 to 4 forms, segments, or pitches of the CF web and fan-fold creases will be in the baffle path of the upper baffle unit 30.

By way of background, standard CF webs come in "segments" or "tears" between the fan-fold lines (also called "creases" or "burst lines"), with the following numbers of standard sprocket holes per CF web segment: 10, 11, 12, 14, 16, 17, 18, 20, 22, and 24. That equates to these corresponding web segment lengths (in inches): 5, 5½, 6, 7, 8, 8½, 9, 10, 11, and 12. Thus, for example, a standard 12 hole CF web segment is only half the incremental length of a 24 hole CF web segment, and a 10 hole per segment CF web is half the length of a 20 hole per segment web. It may be seen that three standard CF web lengths are one-half of or double another, and for those, there is no need to make any change in the system for the fan-fold crease to stop in the desired position. However, for others of these standard CF web lengths, the fan-fold crease would not come out as desired, if feeding is fixed with a selected, pre-set document path length over the arcuate baffle 32. I.e., it is not desirable to have to change the path length.

Accordingly, an additional disclosed feature is to change the registration position of the CF web on the platen of the copier to maintain the desired fan-fold crease stopping point over the restacking tray when the operator indicates to the copier that certain CF web segment sizes are being fed. This can be accomplished through software control of the RDH servo drive motor without hardware changes by the existing preferred document feeder 14 here. This particular document feeder has a servo-driven document platen transport and variable stopping positions for variable registration positions. This need not be disclosed herein since it is already disclosed in issued U.S. Pat. No. 4,579,444 issued Apr. 1, 1986, to Timothy S. Pinckney and Hector J. Sanchez (Xerox Corporation). By slightly shifting the document imaging position on the platen of a particular CF web size by simple software implementation, the system can, without requiring any change in the position of the baffle plate 32 or its corresponding CF path length, still provide the above described desired stopping positions of the web, that is, stopping positions where fan-fold creases are located past the exit of the baffle path yet above the fan-fold restacking area in the tray 22. In other words, shifting the registration position of the web on the platen of the copier correspondingly shifts the intermittent stopping point of the fan-fold crease locations by the same amount, so that optimum restacking can be maintained.

For additional control, if desired, the copier controller can keep track of (count) the number of CF web segments already fed to the catch tray 22 for restacking there, and reset the web registration stopping position to accommodate this increase in stack height.

While the embodiment disclosed herein is preferred, it will be appreciated from this teaching that various alternatives, modifications, variations or improvements therein may be made by those skilled in the art, which are intended to be encompassed by the following claims.

We claim:

1. In a document imaging apparatus in which both conventional cut sheet documents and computer form web fan-folded documents are fed to an imaging station accessible at the upper surface of said imaging apparatus and then said documents are fed in an output path from said imaging station to a documents catch tray system for automatic document restacking, the improvement in said documents catch tray system comprising:

a common shared restacking catch tray area adapted to receive both cut sheet documents and computer form web fan-folded documents, said common shared restacking catch tray area being adjacent said imaging station at the upper surface of said imaging apparatus, said common shared restacking catch tray area being pivotable between a first position at a preferred tray angle for restacking cut sheet documents thereon and a second position at a different preferred angle for fan-fold restacking of a computer form web thereon;

and an upper baffle unit at least partially overlying said output path from said imaging station to said restacking catch tray area, said upper baffle unit being pivotable between a first position for guiding cut sheet documents into said restacking catch tray area for stacking, and a second, raised, position for guiding a computer form web arcuately into said restacking catch tray area for fan-fold restacking.

2. The documents catch tray system of claim 1 wherein said upper baffle unit in said second position provides a said output path which arcuately guides a computer form web document up above the level of said common restacking catch tray area and then downwardly towards said restacking catch tray area.

3. The documents catch tray system of claim 1 wherein said upper baffle unit has an integral baffle guide and provides two different alternative, output path segments request; a first, substantially linear, output path under said baffle guide for guiding cut sheet documents into said restacking catch tray area in said first position of said upper baffle unit, and a second, arcuate, output path segment over said baffle guide for arcuately guiding computer form web documents into said restacking catch tray area in said second position of said upper baffle unit.

4. The documents catch tray system of claim 2, wherein said upper baffle unit has an integral baffle guide and alternatively provides two different segments of said output path; a first output path segment under said baffle guide for guiding cut sheet documents into said restacking catch tray area in said first position of said upper baffle unit, and a second, arcuate, output path segment over and above said baffle guide for guiding computer form web documents into said restacking catch tray area in said second position of said upper baffle unit.

5. The documents catch tray system of claim 3, wherein said upper baffle unit includes an integral gate which is automatically pivoted to automatically selectively gate documents into said respective first or second output paths segments below or over said baffle guide when said upper baffle unit is pivoted between said first and second positions.

6. The documents catch tray system of claim 5, wherein said integral gate comprises an end of said baffle guide adjacent said imaging station which is moved above or below said output path therefrom when said upper baffle unit is pivoted between said first and second positions.

7. The documents catch tray system of claim 1, further including edge guide means for assisting computer form web restacking, which edge guide means is automatically raised into its operative position when said said restacking catch tray area is pivoted into said second position for fan-fold restacking of a computer form web document thereon.

8. The documents catch tray system of claim 7, wherein said upper baffle unit in said second position provides a major portion of said output path which arcuately guides a computer form web document up above the level of said common restacking catch tray area and then downwardly towards said restacking catch tray area adjacent said edge guide means.

9. The documents catch tray system of claim 1 wherein said upper baffle unit in said second position provides an output path for the computer form web fan-folded documents which provides a stopping position for the web with a fan-fold exited from said upper baffle unit but substantially above said restacking catch tray area.

10. The documents catch tray system of claim 9, wherein said feeding of computer form web documents to said imaging station is incremental with variable stopping positions of said computer form web such that said incremental stopping positions accommodate different distances between said fan-folds of a said computer form web.

11. The documents catch tray system of claim 9, wherein said stopping position is a variable function of the amount of computer form web document previously fed to said restacking catch tray area.

12. The documents catch tray system of claim 1, wherein said restacking catch tray area preferred tray angle is between approximately 15 and 17 degrees from the horizontal.

* * * * *